United States Patent [19]
DePirro

[11] 4,417,598
[45] Nov. 29, 1983

[54] PNEUMATIC VALVE

[76] Inventor: Mario DePirro, 330 E. Roosevelt, Lombard, Ill. 60148

[21] Appl. No.: 463,070

[22] Filed: Feb. 2, 1983

[51] Int. Cl.³ .............. F17D 3/00; G05D 9/12
[52] U.S. Cl. .................. 137/2; 73/304 R; 91/402; 137/392; 137/565; 138/93; 138/94; 200/61.05; 222/64; 307/118; 340/620; 361/178
[58] Field of Search .............. 137/2, 15, 565, 386, 137/392; 138/93, 94; 73/301, 304 R; 200/61.05; 307/118; 361/178; 340/620; 417/40; 222/64; 91/357, 402

[56] References Cited
U.S. PATENT DOCUMENTS

| | | | |
|---|---|---|---|
| 2,029,765 | 2/1936 | Durdin, Jr. | 137/414 |
| 2,188,948 | 2/1940 | Huebner | 91/402 |
| 2,279,257 | 4/1942 | Svirsky | 138/93 |
| 2,311,197 | 2/1943 | Ahern | 138/93 |
| 2,514,040 | 7/1950 | Eksergian | 138/93 |
| 2,797,702 | 7/1957 | Martin | 137/392 |
| 3,540,027 | 11/1970 | Rauth et al. | 340/620 |
| 3,726,606 | 4/1973 | Peters | 417/40 |
| 4,203,473 | 5/1980 | Roberson, Sr. | 138/93 |
| 4,351,349 | 9/1982 | Minolti | 138/93 |

Primary Examiner—George L. Walton
Attorney, Agent, or Firm—Basil E. Demeur; Alan B. Samlan; Robert E. Knechtel

[57] ABSTRACT

A pneumatic valve system for sealing off the flow of a liquid at the intersection of two pipes, one of the pipes being vertically disposed with respect to the other pipe. A sensing probe senses liquid at a pre-established height in the vertically disposed height which signals a control system to activate the pneumatic valve system. An expandable, inflatable bladder is positioned from the vertically disposed pipe into the second pipe and is inflated, thereby sealing off the flow of liquid past the bladder. When normal fluid flow is to return, the bladder is deflated and positioned back into its original position within the vertically disposed pipe.

15 Claims, 6 Drawing Figures

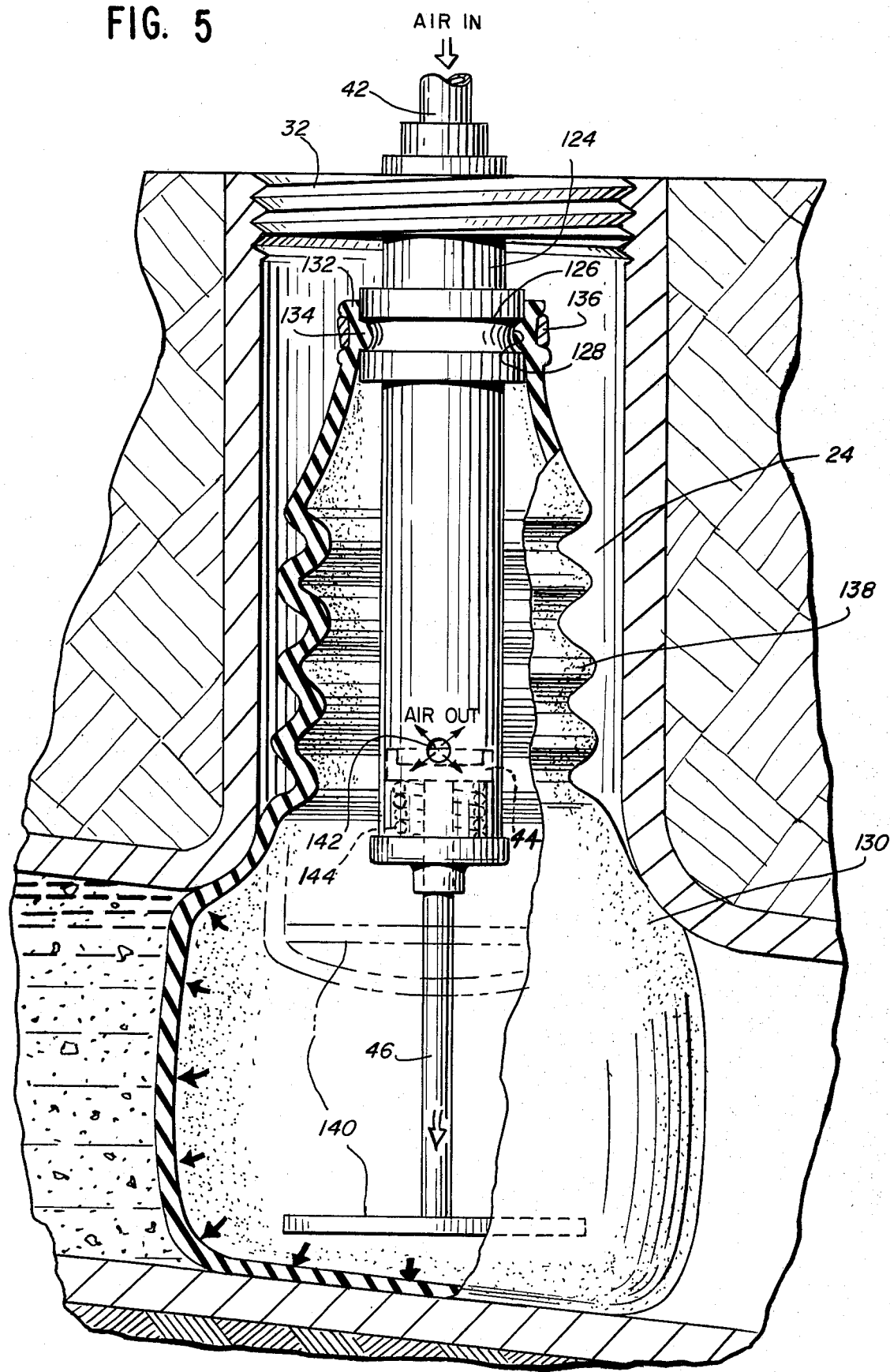

PNEUMATIC VALVE

BACKGROUND OF THE INVENTION

This invention relates to a method and apparatus for closing and sealing off the flow of liquids through a pipe or conduit and more particularly to a pneumatic sealing device to accomplish this result.

Various types and configurations of valves have been used to stop the flow of liquid through pipes. The most commonly used devices are manually operated valves which have input and output pipes connected to it. When the flow of the liquid is to be stopped, the valve is manually turned and seals off the flow of liquid past the valve. This configuration normally requires the pipe to be threaded and screwed into the valve assembly and thus the valve becomes integral with and connected to the input and output pipes. When the pipes are exposed, this design is satisfactory as access to the valve is normally quite easy. Even if the pipes are in a wall, this is still normally acceptable as the valve can be extended a short distance through the wall so that the flow of liquid can be stopped. However, the valve must normally be installed during the initial installation of the pipes as later installation becomes much more difficult, time consuming, and expensive. Large valves of this type can be motor operated from remote locations. However, such devices are normally expensive and used only in industrial applications.

In most residential buildings, the drains and sewage feed into a single sewage pipe which runs below the basement floor. This sewage pipe runs under the house and is connected to the municipal sewage system. There is normally a vertically rising pipe through the basement floor which leads into this sewage pipe and it is commonly referred to as a stand pipe or a clean out tee. The stand pipe provides limited access to the sewage pipe and from the basement to the outside sewage system. Thus, should there be an obstruction in the sewage pipes, a router-type cleaning device can be inserted through the stand pipe and snaked through the pipes to clean out tree roots or other debris which may be blocking the pipes.

During extremely heavy rains it is not uncommon for the municipal sewage system to be unable to accommodate the heavy flood rain waters. This causes the sewage pipes and system to completely fill which in turn causes the sewage to back up into the sewage pipes from individual residences. Without some means to prevent this back up, the basement will commonly flood.

One attempted solution to the problem is to supply a sump pump which will remove water from a sump placed in the basement. This may prove to be acceptable for removing water which is free of sewage, but generally is not designed for the removal of sewage having solid waste particles in it. Furthermore, it does not solve the problem of keeping the sewage from backing up into the house or the basement and the attendant unpleasant odors and solid particles from entering the basement, which must later be cleaned up.

It is not practical to install a valve at the junction of the sewage pipe and the stand pipe as the valve would probably block access of pipe cleaning routers should they be later required. Also, as the valve would probably be operated very infrequently, it might corrode in the opened position and not be operable when needed. Furthermore, a manually operated valve still requires a person to open and close it.

What is required is a valve system which would be selectively placed into the outside sewage pipe to seal off the flow of fluid when required and be easily removed for storage into the existing stand pipe when free fluid flow is desired.

SUMMARY OF THE INVENTION

It is an object of this invention to provide a valve system of the above described type which can be placed and stored in a inoperative position in the stand pipe. When the municipal or outside sewage pipe is to be sealed from the residential sewage pipe under the house, the valve is operated thereby sealing off the back flow of sewage.

It is a further object of the invention to have the valve operated by air pressure. Related to this object is to have the positioning of the valve and the inflation of a rubber sealing member all occur automatically and by means of compressed air.

Still another object is to provide a pneumatic sealing device in a configuration such that it can easily fit within the stand pipe and be adapted for mounting in the stand pipe with minimal modifications to existing pipes.

A related object is to provide a pneumatic valve system which can be connected to an optional sewage ejector pump to permit sewage from the building to be ejected through a bypass system around the valve system into the municipal sewage system.

These and other objects are realized and the problems and limitations of the prior art devices are overcome in this invention. The inventive pneumatic valve system is designed for sealing off the flow of a liquid at the intersection of the stand pipe and the sewage pipe leading from the building to the outside sewer. The stand pipe is normally perpendicular and in a vertical orientation with respect to the sewage pipe. There is a sensor which detects the presence or absence of liquid at a preestablished height in the stand pipe. During the back up of sewage, the detector senses the rise in liquid, and generates a control signal to a control system. There is an expandable bladder which is positioned in the stand pipe and normally out of the flow of liquid in the sewage pipe. When the control signal is received by the control system, which indicates the presence of water or other liquid in the stand pipe, an air compressor is started. The bladder is connected to an air cylinder which receives compressed air from the air compressor. The air cylinder causes a piston within it to expand and pushes the bladder down into the sewage pipe. Additional compressed air is fed into the bladder which causes it to inflate and expand. The inflated bladder completely fills the intersection area of the stand pipe and the sewage pipe. This effectively seals off the stand pipe and the residential sewage pipe under the building from the water and sewage being pushed back from the municipal sewage system.

After the outside municipal sewage system has accommodated the heavy influx of rain water or sewage, and the back up conditions are no longer present, the system is allowed to return to normal and the air compressor is turned off and all air lines are vented to atmosphere. This causes the bladder to deflate and the air cylinder to draw the bladder back up into the stand pipe. Water and sewage from the building is permitted to once again flow into the municipal sewage system.

In an alternate embodiment, there is a bypass pipe which passes around the inflated rubber bladder and into the municipal sewage pipe. There is a check valve which prohibits sewage from backing up into the residential sewage pipe through the bypass pipe. A sewage ejector pump is connected to the residential sewage pipe and receives the sewage from the building. The pump then ejects the sewage through the bypass piping and forces it into the municipal sewage pipe. The sewage ejector pump system is completely sealed and only operates in the event of the rubber bladder being inflated and the normal sewage pipe being sealed off.

Other objects and advantages of the invention will become apparent upon reading the following brief description of the drawings and description of the preferred embodiments.

BRIEF DESCRIPTION OF THE DRAWINGS

FIGS. 5 and 6 are cross sectional views with portions removed of two different alternate embodiments of inflatable sealing bladder systems.

DESCRIPTION OF THE PREFERRED EMBODIMENTS

Figure 1:
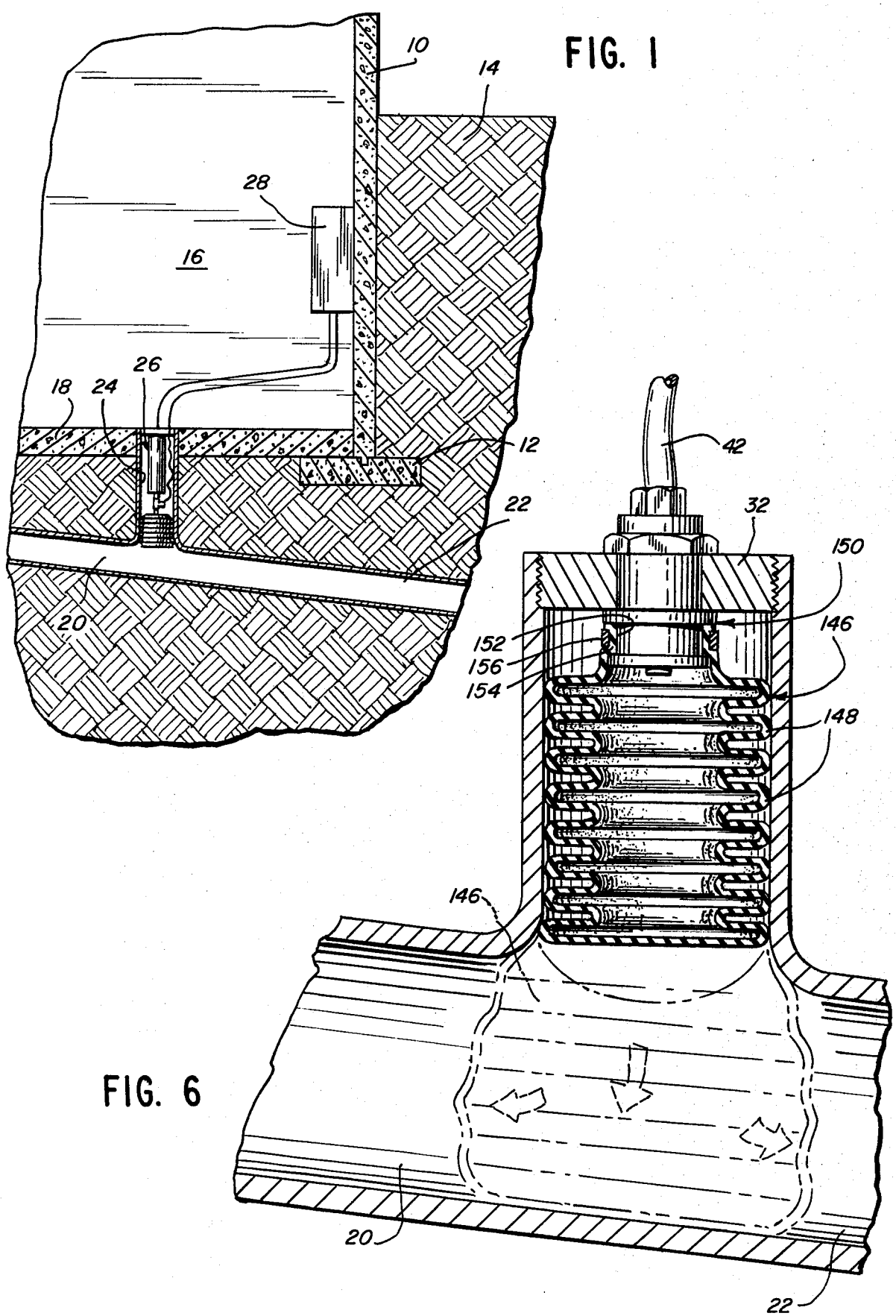
FIG. 1 is a cross sectional view with portions removed of the basement structure of a building wherein applicant's invention may be installed.

Turning first to FIG. 1 there is illustrated the cross sectional view of the basement and foundation of a typical building. There is a concrete wall 10 which forms the foundation of the house and is embedded in a footing 12 at its bottommost portion. The earth 14 is against the outer surface of the concrete wall 10. On the opposite side of the concrete wall 10 is a basement 16. A basement floor 18 is generally made from concrete. Beneath the building is a residential building sewage pipe 20 which is normally 4" or 6" in diameter. This leads into a municipal or outside sewage pipe 22 which is connected to the municipal sewage system. Extending vertically from the building sewage pipe 20 is a stand pipe or clean out tee 24 which intersects the building sewage pipe 20 at its bottommost portion and extends up through the floor 18. The stand pipe is to allow access to the outside sewage pipe 22 should it become clogged with debris, tree roots, or other foreign matter. A router can be snaked through the stand pipe 24 and into the outside sewage pipe 22 to remove this clogging debris thereby permitting free passage of the sewage from the building into the municipal sewage system. The inventive pneumatic valve system 26 is installed in the stand pipe 24 as will be described more fully when describing the other figures. A control box 28 is mounted on the wall and contains the controls and air compressor for the pneumatic valve 26.

Figure 2:
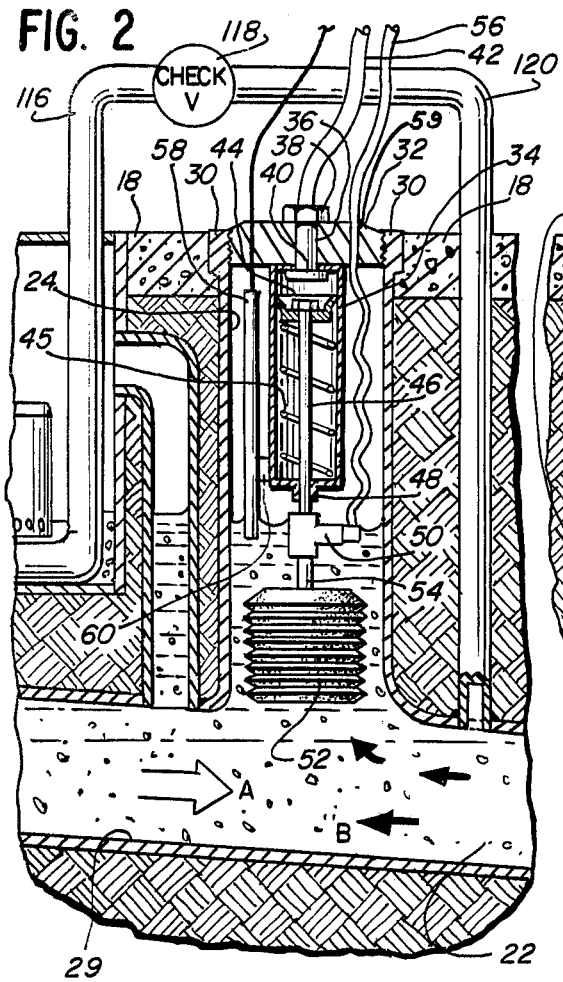
FIG. 2 is a cross sectional view with portions removed showing the inventive pneumatic valve in position in the stand pipe, before inflation, and as back flow from the municipal sewage system is causing the stand pipe to fill with fluid.

The components of the pneumatic valve 26 can be clearly seen in FIG. 2. At the top of the stand pipe 24 and approximate the top surface of the basement floor 18 is a threaded insert 30 which is integral with the stand pipe 24. A threaded cap 32 is received by the threaded insert 30 to be firmly held in place thereby.

An air cylinder 34 is mounted to the threaded cap 32 by means of a bolt 36 passing centrally through the threaded cap 34 and through the central end portion of the air cylinder 34. The bolt 36 has a hex head 38 at its top portion and a similar fastening nut 40 which is placed internally in the air cylinder 34. The bolt 36 has a hollow central passageway along its long axis and is connected to an air hose 42 at the hex head 38. Thus, air passing through the air hose 42 will pass through the bolt 36 and into the air cylinder 34. Within the air cylinder 34 is a piston 44 which is free to move up and down. A spring 45 tends to push the piston 44 towards the top of the air cylinder 34. A piston rod 46 is connected at one of its ends to the piston 44 and has its opposite end extending through a front end 48 of the air cylinder 34. A connector tee 50 is fastened to the end of the piston rod 46 which extends through the front end 48. Opposite the connection of the piston rod 46 to the tee 50 is a rubber bladder 52 which is connected to the tee 50 by means of a fluid coupling 54. Also affixed to the connector tee 50 is a second air line 56 which is fluidly coupled to the connector tee 50 such that air passing through the second air line 56 will pass through the connector tee 50, into the fluid coupling 54 and into the rubber bladder 52. No fluid connection is made between the connector tee 50 and the piston rod 46. The second air line 56 passes through a passageway 59 in the threaded cap 32 which is large enough to permit the air line 56 to freely slide without binding or catching on the cap 32.

A fluid probe 58 is connected to the wall of the air cylinder 34 and is positioned along the cylinder wall 34 so that it senses fluid at a predetermined height in the stand pipe 24. A mounting bracket 60 or a similar device is used to connect the probe 58 to the air cylinder 34.

During normal sewage flow, the sewage from the building flows through building sewage pipe 20 in the direction indicated by arrow A. During normal operations of the sewage system, the water is wholly within the pipes 20, 22 and the stand pipe 24 is empty of all fluid. Thus, the probe 58 does not sense the presence of liquid. During times of heavy rains or conditions giving rise to flooding in the sewage system, the municipal treatment of sewage and rain water is at times insufficient to accommodate the rapid rise of water and sewage levels in the sewage system. Thus, a back flow of sewage is experienced as illustrated by the arrows B. This causes fluid and sewage to back up into the stand pipe 24 as illustrated in FIG. 2. As the back flow fills the stand pipe 24 it reaches the probe 58. This causes the probe 58 to send a signal to the control system.

Figure 3:
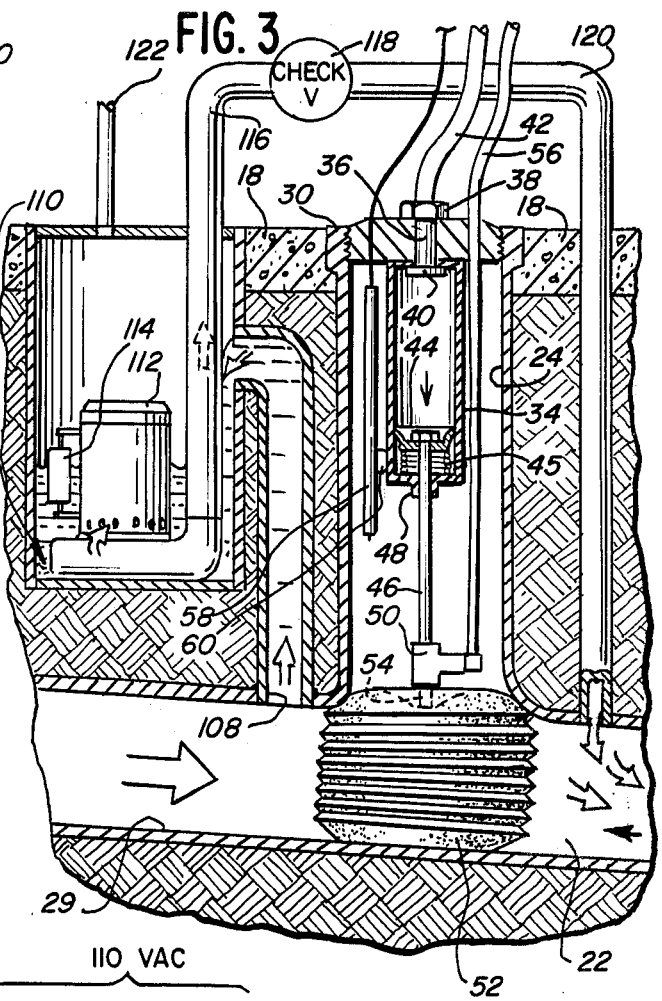
FIG. 3 is a cross sectional view with portions removed similar to FIG. 2 except with the rubber bladder inflated and in position to seal off the sewage pipe.
Figure 4:
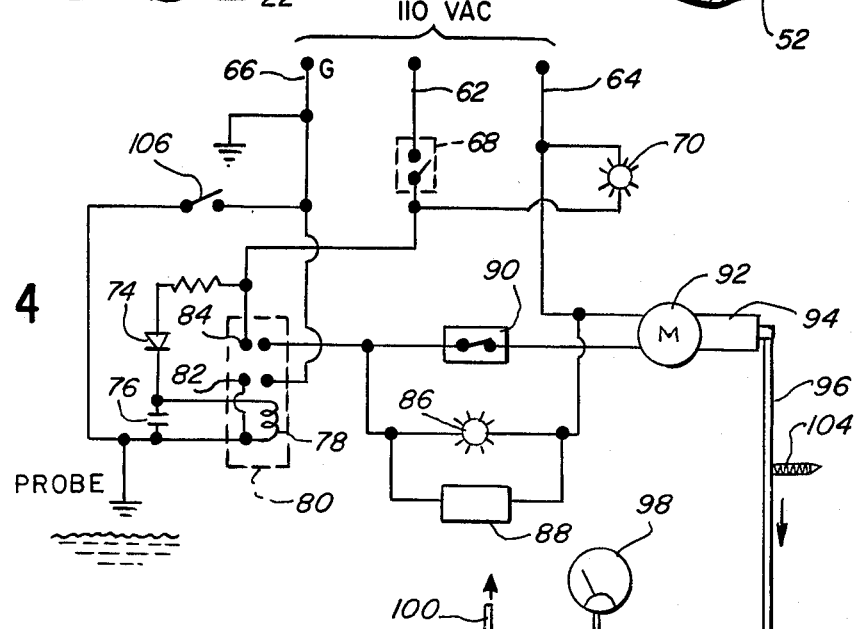
FIG. 4 is a schematic view of the control system which controls the compressed air and inflation of the air cylinder and rubber bladder.

The operation of the pneumatic valve 26 can be most clearly illustrated by looking at the schematic drawing illustrated in FIG. 4 in conjunction with the graphic representation of FIG. 3. As seen on FIG. 4, there is a power line 62 and a neutral 64. Normally this would be 110 volts AC to power the system. There is a ground wire 66 also part of the electrical system. A master switch 68 is connected in the power line 62 and is closed when the system is ready for operation. A visual indication such as indicating light 70 goes on to indicate that power is now on in the system. Connected to the line 62 is a dropping resister 72 of approximately 5k ohms and connected thereto is a diode 74 and a capacitor 76. This provides the direct current necessary to operate a DC coil 78 in a control relay 80.

As the probe 58 senses liquid, it goes to ground thereby completing the circuit energizing the coil 78. This closes a seal in contact 82 within the relay 80 which will then maintain the coil 78 in its energized condition regardless of whether the probe senses liquid or not. A second contact 84 within the relay 80 also closes which is connected into the circuit to control the compressed air system.

With the contact 84 closed, a second indicating light 86 and other annunciators such as a buzzer 88 can be energized to indicate that the relay 80 has closed. A pressure switch 90 is placed between the contact 84 and a compressor motor starter 92. As the pressure switch 90 is normally closed, the motor starter 92 is energized which in turn starts an air compressor 94.

The air compressor 94 has its air output connected to a manifold 96 which feeds the compressed air system. A pressure gauge 98 gives a visual indication as to what the pressure is in the manifold 96. A pressure switch take off 100 is fluid connected to the pressure switch 90. In operation, the pressure switch is set to open, that is the pressure switch will turn the air compressor off, when the pressure in the manifold reaches 25 psi. The pressure switch recloses, that is completes the circuit to the motor starter 92, when the pressure in the manifold drops to 15 to 18 psi. The air hose 42 is connected to the manifold 96 and thus supplies the compressed air to the air cylinder 34. The compressed air forces the piston 44 down (as seen in FIG. 3) which forces the piston rod 46 down towards the building sewage pipe 20. Thus, the rubber bladder 52 is positioned approximately midway into the sewage pipes 20, 22.

A control valve 102 is connected between the manifold 96 and the second air line 56 and is preset to open at approximately 23 psi. The control valve 102 permits compressed air to flow from the manifold 96 into the rubber bladder 52. As the pressure in the manifold 96 is building, the air cylinder 34 immediately receives the compressed air and causes the piston to position the rubber bladder in the sewage pipes. However, the bladder is not inflated until the pressure in the manifold has reached approximately 23 psi. thus assuring accurate positioning of the bladder within the sewage pipe. When the pressure comes up to 23 psi., the control valve 102 opens and the rubber bladder 52 is inflated. This is clearly illustrated in FIG. 3 wherein the rubber bladder 52 seals off the flow of liquid in either direction A or B through the building sewage pipe and the outside sewage pipe 20, 22 respectively. Thus, as long as the bladder 52 remains inflated it will continue to seal off the flow of fluid past it.

After the flood condition or back flow condition has subsided, there is no longer any need to leave the bladder in the pipe and in fact it is necessary to remove it so that normal fluid flow can once again occur. When the user is aware of the return to normal conditions, and that there is no longer any back flow problem, switch 68 is opened which shuts power off to the system. A spring loaded ventilation valve 104 which is connected to the manifold 96 and normally spring biased to a closed position, is manually opened. This causes the air pressure within the manifold and air cylinder to drop to zero. As the pressure in the system is reduced to approximately 2 or 3 psi., the control valve 102 automatically opens which causes the rubber bladder 52 to be deflated. The spring 45 within the air cylinder 34 forces the piston 44 back up towards the threaded cap 32 and draws the rubber bladder 52 back into the stand pipe 24 as illustrated in FIG. 2. Any water within the stand pipe 24 should have been removed by the building sewage pipe 20 by this time. The master switch 68 is reclosed and if in fact a back flow condition still exists, the system will once again be energized and the air compressor will begin a new cycle. If the back flow condition does not exist, the probe will not go to ground and a new compression cycle will not begin.

If the system is desired to be manually tested, a test switch 106 is provided in the electrical circuit which simulates the probe sensing a fluid. Thus, the system can be manually tested by closing the test switch 106 to see if the motor starter, air compressor and associated pneumatic components are operative.

There is an optional bypass system which is clearly illustrated in FIG. 3 such that the plumbing within the building can still be used even when the rubber bladder is inflated and the normal flow of fluid is prohibited. A first bypass pipe 108 is connected to the building sewage pipe 20 at the upper portion of the sewage pipe 20 just before the stand pipe 24. The first bypass pipe 108 discharges into a sewage sump 110. A sewage ejector pump 112 has a float 114 which turns the pump 112 on when the fluid in the sump 110 reaches a predetermined height. The pump 112 then discharges via its discharge pipe 116 past a check valve 118 which only permits flow in one direction, that is out from the sump 110. The sewage is pumped into an exit pipe 120 which discharges into the outside sewage pipe 22 just past the inflated bladder 52 on the other side of the stand pipe 24. The check valve 118 prohibits the back flow from entering the sewage sump 110. A ventilation pipe 122 is located on the top of the sewage pump to permit the controlled escaping of sewage gases. Otherwise the sewage bypass system is completely sealed.

FIG. 5 illustrates an alternate embodiment for the positioning and inflation of the bladder from its normal position in the stand pipe 24 into the sewage pipes 20, 22. There is still present the threaded cap 32 which has an air cylinder 124 firmly affixed at its base end to the cap 32. Again there is an air hose 42 which is connected to the air compressor via a manifold 96. The air is permitted to pass through the fastener used to fasten the cylinder 124 to the air hose 42. Placed around the air cylinder and towards its top end near the threaded cap 32 is a collar 126 which is securely fastened around the cylinder 124. There is a seating channel or groove 128 around the circumference of the collar 126. A modified expandable rubberlike bladder 130 is used for sealing and it is a variation of the previous embodiment. The bladder 130 has a neck 132 with a bead 134 along its inner circumference. The bead 134 is closely received by the seating channel 128. A locking ring 136 is securely fastened around the neck 132 and tightly fastened such that the neck 132 cannot be pulled away from the collar 126.

The bladder 130 has numerous accordion-type pleats 138 along its body such that it can expand to approximately three times its collapsed size. As the compressed air fills the cylinder 124 it forces the piston 44 down and away from the air inlet. This in turn forces the piston rod 46 out from the air cylinder 124 and down towards the bottom of the sewage pipes 20, 22. Fastened to the end of the piston rod 46 is a flat disk 140 which pushes against the bottom of the bladder 130. Thus, the bladder 130 is stretched out from the stand pipe 24 and into the sewage pipes 20, 22. A port 142 is placed in the air cylinder wall 124 towards the bottom of the cylinder which is near the end of the stroke of the piston 44. Thus, compressed air does not fill the bladder 130 until the piston 44 has passed through most of its stroke and has passed the port 142. At the time when the piston 44 passes the port 142 compressed air will flow into the bladder 130 thereby inflating it. It should be noted that the bladder 130 is thus not inflated until the piston rod 46 has forced the flat disk 140 to expand and stretch the bladder 130 into the sewage pipes 20, 22.

It is readily apparent that the alternate embodiment thus alleviates the need for the control valve 102 which was part of the control circuitry. As the compressed air is bled from the system after the flooding or back flow condition has been corrected, the bladder and air cylinder will lose pressure simultaneously and a spring 144 within the air cylinder 124 will cause the piston 44 to be forced back up towards the top of the cylinder 124. The expandable pleats 138 having a memory will draw the bladder back up into the stand pipe 24. It should also be noted that this alternative embodiment will alleviate one of the air lines 56 which was previously required to inflate the bladder.

A second alternate embodiment is illustrated in FIG. 6 which completely alleviates the need for a piston to position the bladder in the sewage pipes. Instead, a very flexible material which is capable of substantial vertical flexing is used to form a bladder 146 having numerous pleats 148. As the bladder 146 inflates, it expands downward and fills the intersection of the sewage pipes 20, 22 with the stand pipe 24. The inflated configuration is shown in phantom in FIG. 6. Retainer rings (not shown) could be placed around the top of the bladder 146 to restrict horizontal expansion of the top of the bladder within the stand pipe 24. Furthermore, a modified coupling 150 must be used to pass through the cap 32. The coupling 150 should have a groove 152 to receive a necked portion 154 of the bladder 146. A fastening clamp 156 similar to the locking ring 136 is used to hold the bladder 146 in place. The simplicity of this configuration is its greatest attribute as the air cylinder and piston are not required reducing cost and potential repair problems which always rise with the increase of components.

Thus, it is apparent that there has been provided, in accordance with the invention a pneumatic valve system which will stop sanitary sewer back ups into buildings. The invention fully satisfies the object, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A pneumatic valve system for sealing off the flow of a liquid at the intersection of two pipes, one of the pipes being at least partially vertically disposed with respect to a second pipe, the system comprising:
   a control means;
   sensing means associated with the vertically disposed pipe for detecting the presence or absence of liquid at an established height in the vertically disposed pipe and for generating a control signal which is connected to the control means;
   expandable bladder means positioned in the vertically disposed pipe and out of the flow of liquid in the second pipe;
   means to position the expandable bladder in the second pipe in accordance with the control signal generated by the sensing means;
   means to inflate the bladder means in accordance with the control signal generated by the sensing means to seal off the flow of liquid at the intersection of the two pipes;
   the operation being such that the bladder means is positioned in the vertically disposed pipe when the sensing means detects the absence of liquid at the established height in the vertically disposed pipe and positioned in the second pipe when the sensing means detects the presence of liquid at the established height, the control means further controlling the means to inflate the bladder in the second pipe thereby sealing off the flow of liquid at the intersection of the two pipes.

2. The pneumatic valve system of claim 1 wherein the means to inflate the bladder is a compressed air source which is operated responsive to signals from the control means.

3. The pneumatic valve system of claim 2 wherein the means to position the expandable bladder is the internal expansion ability of the bladder itself to stretch during its inflation into the second pipe.

4. The pneumatic valve system of claim 2 wherein the means to position the expandable bladder in the second pipe comprises an air cylinder and piston placed in the vertically disposed pipe, the air cylinder connected to the compressed air source, one end of the piston extending out from the air cylinder and being forced towards the second pipe when the compressed air source is activated, thereby forcing the bladder into the second pipe.

5. The pneumatic valve system of claim 4 wherein the bladder is mounted at the end of the piston extending out from the air cylinder, a bladder control valve with one end connected to the bladder and the other end connected to the compressed air source, the control valve opening and permitting inflation of the bladder after the piston has forced the bladder into the second pipe.

6. The pneumatic valve system of claim 5 wherein the control valve is a pressure control valve which opens at a pressure higher than the pressure required by the piston to position the bladder in the second pipe, with both the air cylinder and bladder control valve connected to the same compressed air source.

7. A pneumatic valve system of claim 4 and further comprising port valve means in the air cylinder positioned towards the end of the piston stroke, the bladder placed around and enclosing the port valve means, the end of the piston extending out from the air cylinder, the piston forcing and positioning the bladder in the second pipe when the compressed air source is activated, the port valve means opening when the piston passes the port valve during its expansion stroke thereby allowing the compressed air to pass through the port and inflate the bladder.

8. The pneumatic valve system of claim 7 wherein the two pipes intersect in a "t" intersection, and the inflated bladder substantially fills the intersection of the pipes whereby fluid is prohibited from flowing through any leg of the "t".

9. The pneumatic valve system of claim 7 and further comprising a check valve in the circumventing piping to permit liquid to flow around the sealed bladder in only one direction.

10. The pneumatic valve system of claim 1 and further comprising pipe bypass means to circumvent the area wherein the sealed bladder is positioned, the pipe bypass means comprising a pump, circumventing piping, and associated controls to pump liquid around the sealed bladder through the circumventing piping.

11. A method for sealing off the flow of liquid at the intersection of two pipes, one of the pipes positioned at least partially vertical to the other pipe and an expandable bladder means disposed therein the method comprising;
   (a) sensing the presence or absence of liquid at an established height in the vertical pipe;
   (b) generating a control signal in response to the sensing means detecting the presence of liquid at the establised height;
   (c) repositioning the expandable bladder means in the other pipe in response to the control signal generated detecting the presence of liquid;
   (d) inflating the expandable bladder means after it is repositioned in the other pipe in response to the sensing means detecting the presence of the liquid at the established height and
   (e) sealing off the flow of liquid at the interesection of the two pipes.

12. The method of claim 11 and further providing an air cylinder and piston in the vertical pipe connected to a compressed air source, forcing one end of the piston outwards from the air cylinder towards the other pipe, and forcing the bladder into the other pipe.

13. The method of claim 12 and further providing pipe bypass means circumventing the sealed bladder area permitting liquid to flow around the sealed bladder.

14. The method of claim 11 and further providing deflating the bladder.

15. The method of claim 14 further providing positioning the bladder back in its initial position in the vertical pipe.

* * * * *